United States Patent
Lachman et al.

(10) Patent No.: US 8,364,184 B2
(45) Date of Patent: Jan. 29, 2013

(54) SIGNAL CANCELLATION IN A SATELLITE COMMUNICATION SYSTEM

(75) Inventors: Avihay Lachman, Tel Aviv (IL); Yariv Hayoun, Nir Tzvi (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 806 days.

(21) Appl. No.: 12/554,059

(22) Filed: Sep. 4, 2009

(65) Prior Publication Data

US 2010/0056192 A1    Mar. 4, 2010

Related U.S. Application Data

(60) Provisional application No. 61/094,185, filed on Sep. 4, 2008.

(51) Int. Cl.
*H04B 15/00* (2006.01)

(52) U.S. Cl. ............. 455/501; 455/63.1; 455/67.13; 455/12.1; 455/139; 455/278.1; 455/296; 370/316; 370/286; 375/326; 375/346

(58) Field of Classification Search .......... 455/501, 455/63.1, 67.11, 67.13, 12.1, 22, 139, 275, 455/276.1, 278.1, 283, 284, 285, 296, 427; 370/316, 317, 286; 375/211, 326, 346

See application file for complete search history.

(56) References Cited

U.S. PATENT DOCUMENTS

| | | | |
|---|---|---|---|
| 5,596,439 A | 1/1997 | Dankberg et al. | |
| 5,625,640 A * | 4/1997 | Palmer et al. | 375/132 |
| 6,515,980 B1 * | 2/2003 | Bottomley | 370/342 |
| 6,859,641 B2 | 2/2005 | Collins et al. | |
| 6,907,093 B2 | 6/2005 | Blount et al. | |
| 7,228,104 B2 | 6/2007 | Collins et al. | |
| 7,349,505 B2 | 3/2008 | Blount et al. | |
| 7,522,877 B1 | 4/2009 | Avellan et al. | |

* cited by examiner

*Primary Examiner* — Shaima Q Aminzay
(74) *Attorney, Agent, or Firm* — Banner & Witcoff, Ltd.

(57) ABSTRACT

A satellite communication system comprised of a hub and plurality of remote terminals, wherein the system is configured for frequency reuse, a method and apparatus for signal cancellation are disclosed. The disclosed method and apparatus enable the hub to extract return link signals overlaying a transmitted forward link signal, wherein the forward link signal is transmitted at a power level higher than that of the overlaying return link signals.

16 Claims, 4 Drawing Sheets

SIGNAL CANCELLATION IN A SATELLITE COMMUNICATION SYSTEM

RELATED APPLICATIONS

The present application is a non-provisional of U.S. Provisional application Ser. No. 61/094,185, filed Sep. 4, 2008, entitled "Signal Cancellation in a Satellite Communication System," the contents of which are incorporated herein by reference in their entirety for all purposes.

TECHNICAL FIELD

This invention relates to satellite communication networks and to the field of signal cancellation for frequency reuse.

BACKGROUND

In the field of satellite communication networks, an efficient use of space segment resources is a very much desired quality. Efficient use of space segment may reduce the operating costs of such networks and therefore has significant impact on the economics of such networks.

One group of methods known in the art for increasing space segment utilization efficiency is frequency reuse (also sometimes referred to as carrier-in-carrier). In these methods, two or more stations communicating via a satellite transmit on the same frequency bandwidth. In order to receive transmissions of other stations which may be overlaying its own transmitted signal, a satellite communication station may include a cancellation device, which may use a sample of the transmitted signal, generate a cancellation signal, combine the cancellation signal with the received signal and extract the signals of interest.

In the field of interfering signal cancellation for frequency reuse purposes, the following methods may be considered relevant prior art:

- U.S. Pat. No. 6,859,641, Collins et al, Adaptive Canceller for Frequency Reuse Systems
- U.S. Pat. No. 7,228,104, Collins et al, Adaptive Canceller for Frequency Reuse Systems
- U.S. Pat. No. 5,596,439, Dankberg et al, Self Interference Cancellation for Two Party Relayed Communication
- U.S. Pat. No. 6,907,093, Blount et al, Method and Apparatus for Relayed Communication using Band-Pass Signals for Self Interference Cancellation
- U.S. Pat. No. 7,349,505, Blount et al, Relayed Communication with Versatile Self Interference Cancellation
- U.S. Pat. No. 7,522,877, Avellan et al., Noise Reduction System and Method Thereof

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In a satellite communication system, comprised of a hub and a plurality of remote terminals (e.g. VSATs), the hub may be configured to transmit data towards the remote terminals over a forward channel (forward link signal) and remote terminals may be configured to transmit data towards the hub over one or more return channels (return link signals). This satellite communication system may be further configured to use a frequency reuse method and transmit the forward link signal and some or all return link signals using the same bandwidth.

This satellite communication system may be configured to use a signal cancellation method at the hub for at least the purpose of enabling the hub to receive all return link signals of interest. In addition, the hub may be configured to transmit the forward link signal at a power level sufficiently higher than that of the return link signals, at least for the purpose of enabling the remote terminals to receive the forward link signal without using any cancellation method.

One aspect of this invention is a cancellation method that may be used at the hub of said satellite communication system. This method may be comprised of demodulating a sample of the forward link signal and demodulating a received combined signal comprised of a relayed forward link signal and return link signals, wherein the relayed forward link signal is sufficiently stronger than the return link signals at least for the purpose of enabling its demodulation directly from the received combined signal.

In another aspect of this invention, said method may be further comprised of re-modulating both signals at high sample rate, correlating the signals to produce a delayed forward link signal, adjusting phase and amplitude of the delayed forward link signal to produce a cancellation signal and subtracting the cancellation signal from the received combined signal for at least the purpose of extracting return link signals of interest.

BRIEF DESCRIPTION OF THE DRAWINGS

Figure 1:
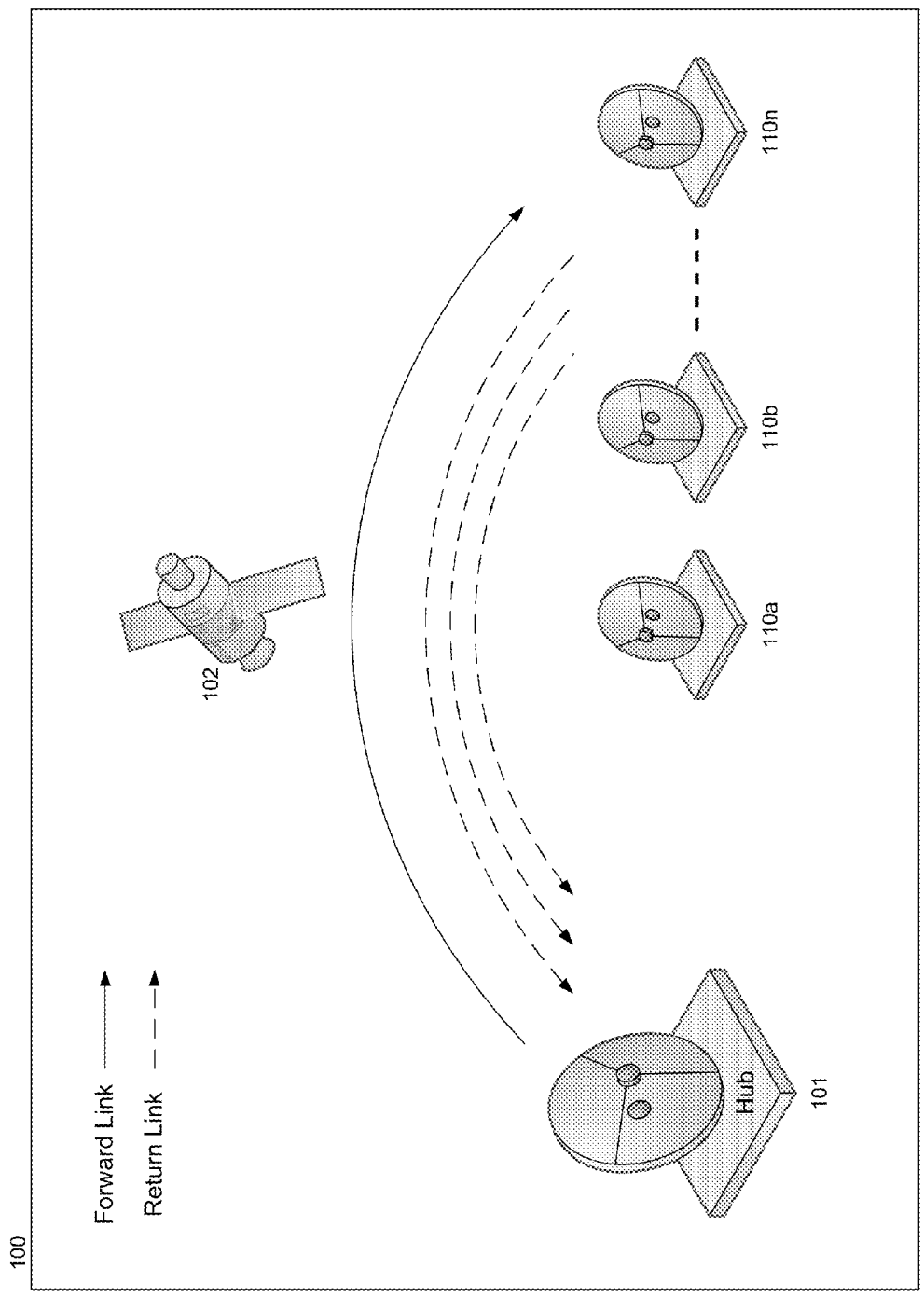

Having thus described the invention in general terms, reference will now be made to the accompanying drawings, which are not necessarily drawn to scale, and wherein:

FIG. 1 shows a satellite communication system in accordance with the aspects of this invention.

Figure 2:
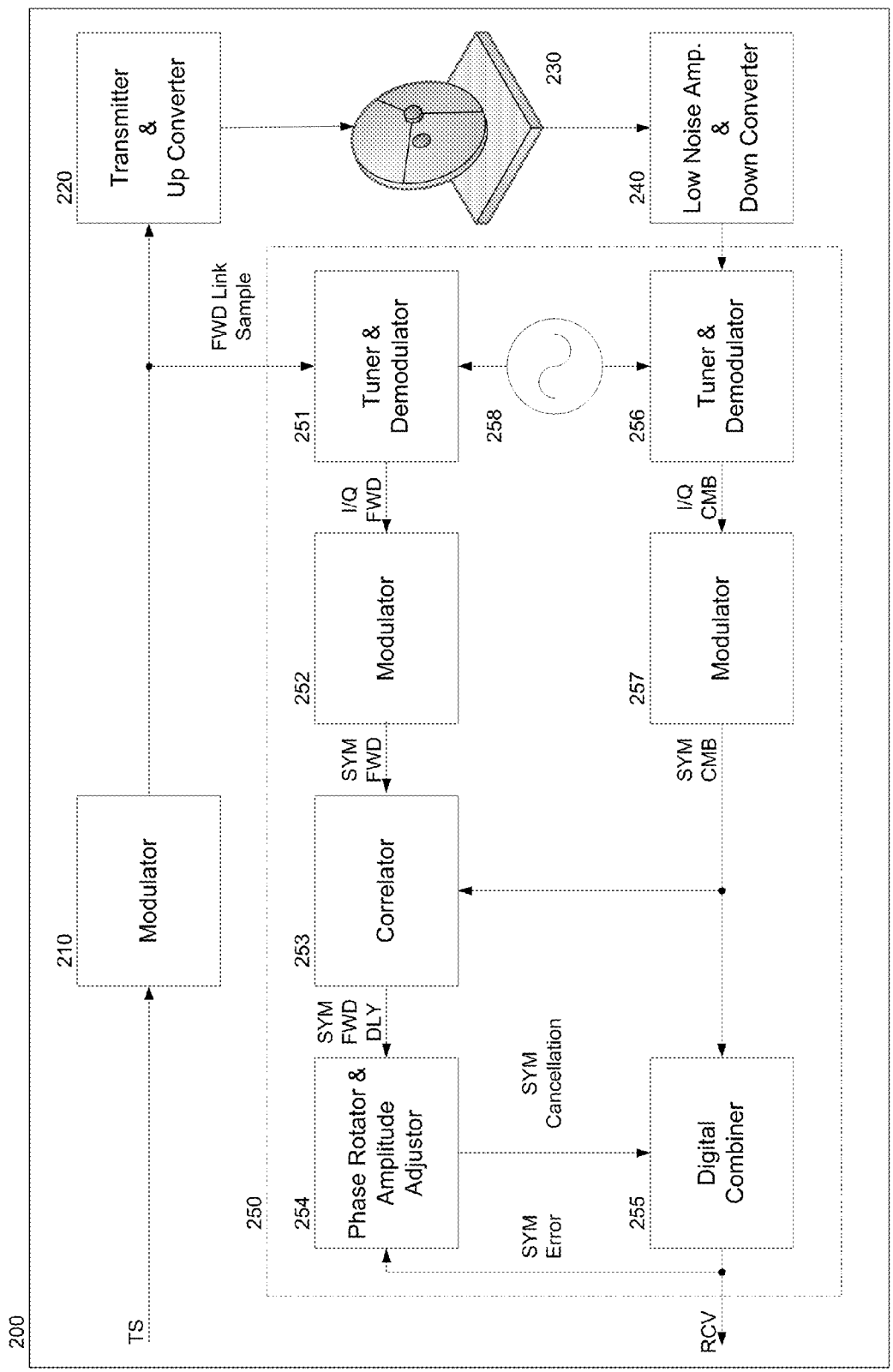

FIG. 2 shows a block diagram of a canceller coupled with a transmission path and a reception path in accordance with the aspects of this invention.

Figure 3:
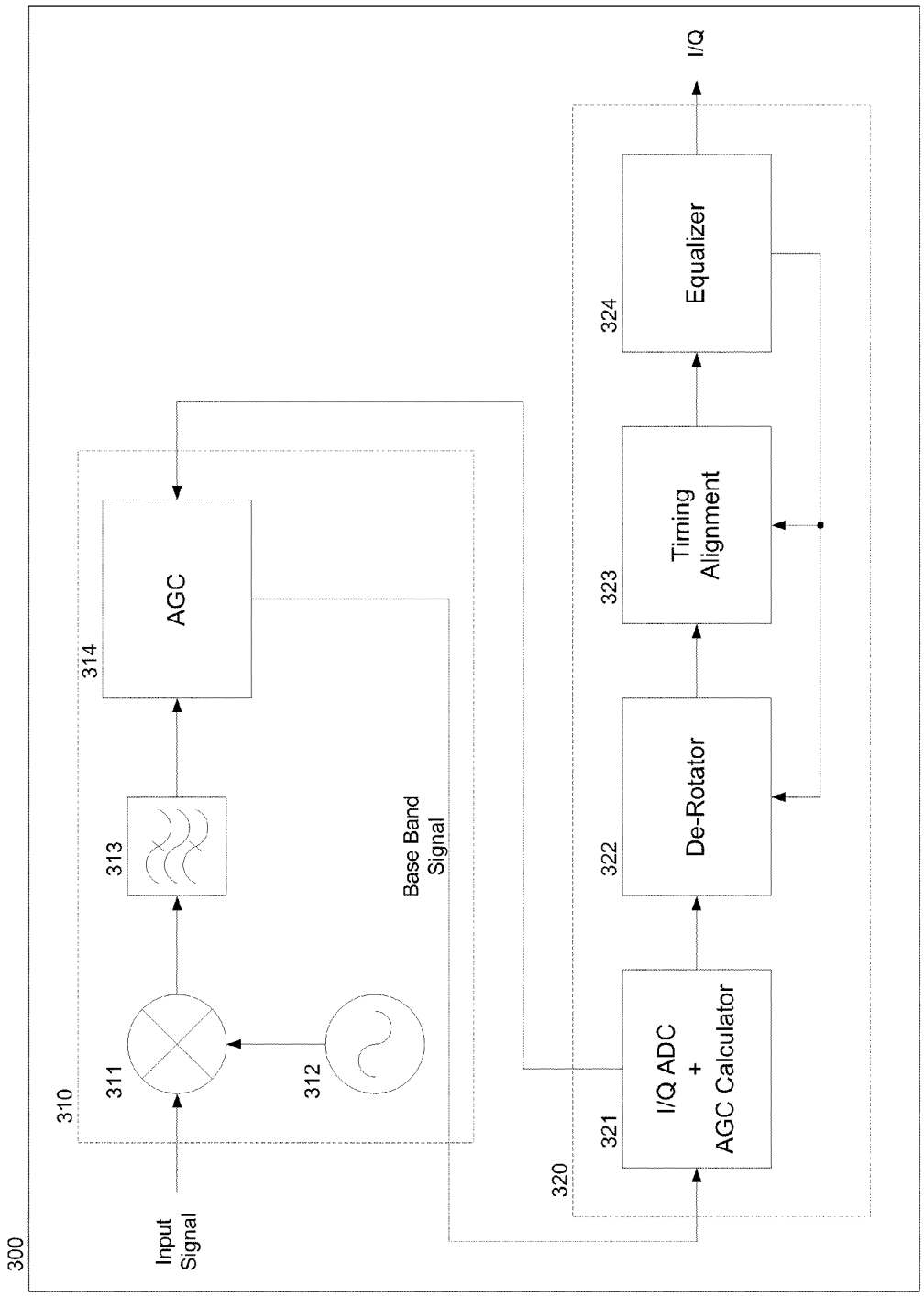

FIG. 3 shows block diagrams of a tuner and a demodulator in accordance with the aspects of this invention.

Figure 4A:
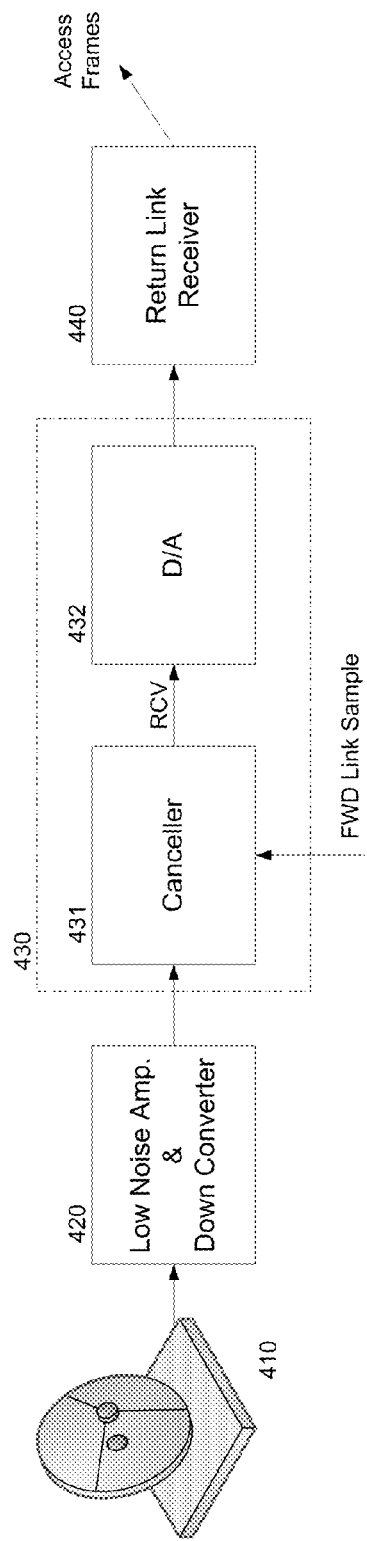
Figure 4B:
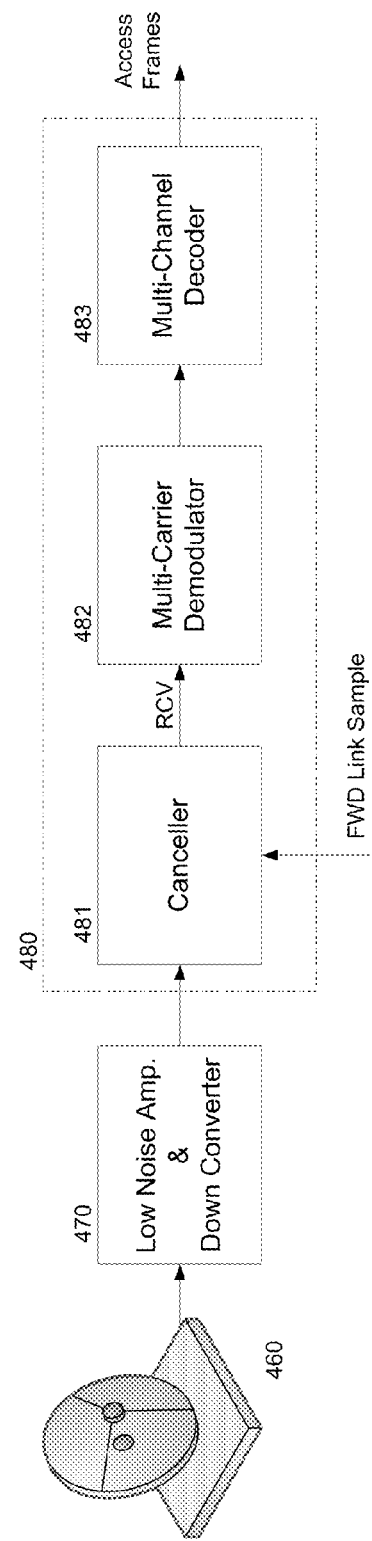

FIGS. 4a and 4b show preferred embodiments in accordance with the aspects of this invention.

DETAILED DESCRIPTION

FIG. 1 shows a satellite communication system 100, comprised of a hub 101, a satellite 102 and plurality of remote terminals 110a to 110n (referred to herein as remote terminals 110). Hub 101 may be configured to transmit a forward link signal via satellite 102 towards remote terminals 110. The remote terminals 110 may be configured to receive the forward link signal and to transmit return link signals towards hub 101, again via satellite 102. Hub 101 may further be configured to receive return link signals.

In many embodiments of satellite communication system 100, the forward link signal and the return link signals are transmitted over separate bandwidth segments, thus making it possible for remote terminals 110 to receive the forward link signal and for hub 101 to receive return link signals without requiring any special considerations or equipment. Furthermore, transmission power for any of the forward link signal and the return link signals may be optimized according to any other parameters of the signal, such as but not limited to symbol rate, modulation and coding. Therefore such embodiments are often bandwidth limited rather than power limited, meaning the relative use of bandwidth out of the satellite's bandwidth resources is greater than the relative use of power out of the satellite's transmission power resources.

In satellite communication systems as described above, satellite resources may be used more efficiently through methods, which may require additional power but reduce the required bandwidth. One such method reuses satellite bandwidth by overlaying the forward link signal with some or all of the return link signals. As the forward link signal and some or all the return link signals are transmitted over the same bandwidth, special considerations may be required both at hub 101 and at remote terminals 110 for at least the purpose of enabling reception of the respective signals of interest.

At hub 101, a cancellation device and/or a cancellation method may be required for at least the purpose of canceling or adequately suppressing the relayed forward link signal from the received signal. Once the relayed forward link signal is adequately suppressed or cancelled, the overlaying return link signals may be received and demodulated.

However, using a cancellation method or a cancellation device at each remote terminal 110a to 110n is practically infeasible both technically and economically. Thus reception of the forward link signal by remote terminals 110 may be enabled by configuring hub 101 to transmit the forward link signal at a power level sufficient for overcoming the interference caused by the overlaying return link signals. As the forward link signal may be received at a sufficiently higher power level than the overlaying return link signals, remote terminals 110 may be configured to receive the forward link signal without using any cancellation method or cancellation devices.

FIG. 2 shows a transmission path and a reception path of a satellite communication station, such as hub 101 of FIG. 1, where a frequency reuse method as previously described is used.

The transmission path may be comprised of modulator 210 and a transmission unit 220. Modulator 210 may be configured to receive a transport stream (e.g. MPEG frames or Baseband Frames), which may include the information that has to be transmitted over the forward link, and modulate it onto a low frequency carrier (e.g. at IF or L-band) in accordance with a predefined modulation scheme (such as but not limited to DVB-S or DVB-S2 respectively). In some embodiments, the transport stream may be provided to modulator 210 as a stream of complex (or real) symbols. Transmission unit 220 may be configured to receive a modulated signal at a low frequency (e.g. at IF or L-band), up-convert the signal's frequency to a satellite up-link frequency (e.g. in C-band, Ku-band, Ka-band or any other suitable frequency band supported by satellite 102), amplify the signal and then transmit the signal via the hub's antenna 230.

The reception path may include a low noise amplifier and frequency down converter 240, which may be configured to receive a signal from antenna 230, amplify the received signal and down-convert its frequency from a satellite down-link frequency (e.g. in C-band, Ku-band, Ka-band or any other suitable frequency band supported by satellite 102) to a lower frequency (e.g. at IF or L-band). In addition, since the satellite communication system may be configured for frequency reuse, the received signal may be comprised of one or more return link signals and the relayed forward link signal. Therefore the reception path may further include cancellation unit 250, for at least the purpose of canceling or sufficiently suppressing the relayed forward link signal from the received signal and extracting return link signals of interest.

Cancellation unit 250 may be configured to receive via a first input port a sample of the forward link signal, wherein this sample may be taken at the output of modulator 210 for at least the purpose of receiving the sample at cancellation unit 250 at a low frequency (e.g. at IF or L-band). Cancellation unit 250 may be further configured to receive a combined signal at a second input port, wherein the combined signal is comprised of one or more signals of interest and a relayed version of the signal provided at the first input port of canceller unit 250. In preferred embodiments, the second input of cancellation unit 250 may be coupled with the output of down conversion 240 for at least the purpose of receiving the combined signal at cancellation unit 250 at a low frequency (e.g. at IF or L-band).

Inside cancellation unit 250, the sample of the forward link signal and the combined signal are received and demodulated by tuner & demodulator units 251 and 256 respectively. Demodulators 251 and 256 may be configured to output digitally sampled I/Q symbols of the forward link signal (I/Q FWD) and digitally sampled I/Q symbols of the combined signal (I/Q CMB) respectively. In addition, both tuner & modulator units 251 and 256 may be configured to generate internal signals, such as but not limited to clocks and local oscillators, from an externally received reference signal. At least for the purpose of eliminating frequency offsets between the two demodulators, cancellation unit 250 may include reference signal source 258, which may provide the same reference signal to both tuner & modulator units 251 and 256.

Furthermore, cancellation unit 250 may be configured to pass the stream of digitally sampled I/Q symbols of the forward link signal (I/Q FWD) and the stream of digitally sampled I/Q symbols of the combined signal (I/Q CMB) via modulators 252 and 257 respectively, for at least the purpose of sufficiently increasing the number of samples in each symbol.

Cancellation unit 250 may be configured to input both high-rate digitally sampled symbol streams (SYM FWD and SYM CMB) to correlator 253. Correlator 253 may be configured to delay the stream of samples of the forward link signal in reference to the stream of samples of the combined signal and output a delayed stream of samples of the forward link signal (SYM FWD DLY).

Let X and Y represent the two streams of samples at the input of correlator 253. During convergence (i.e. the process of finding the correct offset between the streams), correlator 253 may be configured to store 2T samples of stream Y and (2T+1)+(2M+1) samples of stream X, at least for the purpose of finding the correct offset within a range of 2M+1 samples. For each point n within the range of [−M, M], correlator 253 may be configured to calculate a scalar product over a 2T+1 sample long vector, using the formula:

$$\mathrm{Corr}[n] = \sum_{k=-T}^{+T} X[k-n]^* Y[k]$$

$$n = [-M, M]$$

Therefore, correlator 253 may be configured to calculate a correlation vector of 2M+1 scalars (Corr[n] where n=[−M, M]), wherein the calculation of the first scalar of the correlation vector starts at the first sample taken from stream X and the calculation of each consecutive scalar of the correlation vectors starts one sample after the first sample used for calculating the respective previous scalar.

Correlator 253 may be further configured to find the maximal value within this vector of scalars and to determine its position within the vector. This step may be computed in its entirety once all scalars are calculated. In other embodiments, this step may be computed in parts as each scalar is calculated, so that once the last scalar is calculated the value and position of the maximal scalar is also known. Correlator 253 may then be further configured to determine the correct offset between the two streams as the position or index of the maximal scalar within the correlation vector.

Furthermore, correlator 253 may be unaffected by any phase shift or amplitude difference between the signals represented by the two input streams. The calculated offset (delay) may be the same for phase and amplitude adjusted signals as well as for phase and amplitude non adjusted signals. Though the maximal correlation value may be higher for adjusted signals (compared to non-adjusted signals), this may be insignificant in regard to this invention.

Once the offset is calculated (i.e. the correlator converges), correlator 253 may be configured to delay the stream of samples of the forward link signal in reference to the stream of samples of the combined signal in accordance with the calculated offset value (hence producing at its output a delayed stream of samples of the forward link signal (SYM FWD DLY)). In addition, correlator 253 may be further configured to continue the correlation process as described above and to constantly verify the offset value within a predefined range around the initially calculated offset value. Once a change in offset value is determined (e.g. due to a change in the satellite link delay, which may result from small changes in the satellite's position), correlator 253 may be configured to modify the delay applied to the stream of samples of the forward link signal in accordance with the new offset.

Cancellation unit 250 may be further configured to pass the delayed stream of samples of the forward link signal (SYM FWD DLY) via phase rotator and amplitude adjustor 254, for at least the purpose of generating a cancellation signal (SYM Cancellation), which may also be in the format of a high-rate digitally sampled signal. Phase rotator and amplitude adjustor 254 may be configured to adjust the phase and amplitude of the delayed forward link signal (SYM FWD DLY) to match the phase and amplitude of the relayed forward link signal within the combined signal and in accordance with a correction or an error signal, which may be provided by digital combiner (255). In some embodiments, phase rotator and amplitude adjustor 254 may be configured to include a finite impulse response (FIR) filter, for at least the purpose of reducing the error signal even further.

Finally, cancellation unit 250 may be configured to input the high-rate sampled cancellation signal, which may be output from phase rotator and amplitude adjustor 254, and the high-rate sampled combined signal into digital combiner 255. Digital combiner 255 may be configured to subtract the digital samples of the delayed forward link signal from the corresponding digital samples of the combined signal and to output the resulting digital samples. Therefore the output of digital combiner 255 may include high-rate digital samples of the combined signal less the delayed forward link signal. Thus the relayed forward link signal may be cancelled or sufficiently suppressed at the output of digital combiner 255 (RCV).

The output of digital combiner 255, which may be also the output of cancellation unit 250, may be comprised of samples of return link signals and perhaps also some additional residual noise, which may be the result of an imperfect cancellation (e.g. due to inaccurate phase rotation or amplitude adjustment of the delayed forward signal, or due to channel effects other than amplitude and/or phase of the delayed forward link signal, which may not be eliminated by phase rotator and amplitude adjustor 254). For at least the purpose of reducing this residual noise, cancellation unit 250 may be configured to provide the output signal (RCV) as feedback to phase-rotator and amplitude adjustor 254.

Furthermore, cancellation unit 250 may be configured to have the sampling rate of the combined signal, both at the output of modulator 257 and consequently at the output of digital combiner 255 and the cancellation unit 250 as a whole, greater than a minimal sampling rate which may be required for any return link signal within the received combined signal, at least for the purpose of having sufficient number of samples per symbol for any return link signal. As a result of such configuration of cancellation unit 250, the number of samples per symbol for any return link signal may or may not be an integer number, i.e. the sample rate may or may not be an integer multiplication of the symbol rate of any return link signal.

Furthermore, a satellite communication system configured to include cancellation unit 250 may be configured to have the symbol rate of the forward link signal at least one order of magnitude (i.e. 10 times) higher than the symbol rate of the fastest return link signal overlaying the forward link's bandwidth. Such configuration may be used at least for the purpose of configuring cancellation unit 250 to sample the received combined signal in accordance with the forward link signal's symbol rate while maintaining all the necessary information included in lower symbol rate signals (e.g. return link signals) and thus enabling their recovery or demodulation by any other function or device which may be coupled with the output of cancellation unit 250.

FIG. 3 shows a block diagram of tuner and demodulator 300, which may be any of tuner and demodulator 251 and 256. Tuner and demodulator 300 may be comprised of tuner 310 coupled with demodulator 320.

Tuner 310 may be configured to receive an input signal, which may contain a signal of interest such as a forward link signal. Tuner 310 may be further configured to receive the input signal at low frequency (e.g. at IF or L-band) and use down-converter 311 for at least the purpose of tuning on the signal of interest, which may be included in the input signal, and to produce it as a base band signal. For at least the purpose of said tuning, down converter 311 may be further configured to receive a local oscillator signal, which may be generated by synthesizer 312. Synthesizer 312 may be a configurable synthesizer, for at least the purpose of enabling tuning on the signal of interest anywhere within a predefined frequency range. Furthermore, synthesizer 312 may be configured to use an externally provided reference signal for at least the purpose of enabling frequency synchronization of two or more tuners such as tuner 310.

Tuner 310 may be further configured to include filter 313 and a gain control function 314, for at least the purpose of preparing the signal of interest for digital sampling, e.g. by a coupled demodulator. Gain control function 314 may be further configured to receive a feedback from the sampling function and to adjust the base band signal's amplitude according to the received feedback.

Demodulator 320 may be configured to receive a signal of interest as a base band signal and sample it using I/Q analog to digital converter (ADC) 321. ADC 321 may also be configured to generate a feedback signal for a tuner's gain control unit (such as AGC 314) for at least the purposes of optimizing the signal level and avoiding saturation of the analog to digital converter.

Demodulator 320 may be further configured to pass the digital I/Q samples of the signal of interest via de-rotation function 322, a timing alignment function 323 and equalizer 324, for at least the purpose of providing optimal samples of the signal of interest.

De-rotator 322 may be configured to acquire the frequency of a carrier, detect any offsets in the acquired frequency and correct the carrier frequency offset within the digitally sampled I/Q signal.

Timing alignment 323 may be configured to acquire a precision timing of the carrier samples at least for the purpose of providing optimal samples. Once timing is acquired, an interpolator may be used for at least the purpose of correcting sample timing offsets within the digitally sampled I/Q signal.

Equalizer 324 may be configured to further compensate for channel effects, including but not limited to echoes and/or improper channel filtering. The output of equalizer 324 may therefore include time and frequency corrected sampled I/Q symbols of a signal at a sampling rate which may be equal to the symbol rate of the demodulated signal.

FIG. 4a shows a preferred embodiment of the cancellation method described above. In this embodiment, cancellation function 431, which is similar to the cancellation method described above, may be incorporated into cancellation apparatus 430, which may be connected between down-converter 420 and return link receivers 440. As return link receivers 440 may be configured to receive an analog signal, cancellation apparatus 430 may be configured to further include a digital to analog converter 432, which may be configured to receive the resulting digitally sampled signal of the cancellation process from cancellation function 431 and to output a corresponding analog signal at the frequency range expected by return link receivers 440 (e.g. at IF or L-band).

FIG. 4b shows another preferred embodiment of the cancellation method described above. In this embodiment, the cancellation function may be embedded into multi-channel (or single channel) return link receiver 480, which may be connected to down converter 470. As the output of cancellation function 481, which is similar to the cancellation method described above, may be already in a digital format, multi-carrier digital demodulator 482 may be used to demodulate return link signals of interest directly from output signal of cancellation function 481. The advantage of this method is that no additional double conversion of the signal to analog form and back to a digital form is needed and therefore degradation of the signal is minimized.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A method for canceling a transmitted signal from a received combined signal, the received combined signal comprising signals of interest overlaying a relayed version of the transmitted signal, the method comprising: demodulating a sample of the transmitted signal and producing digitally sampled I/Q symbols of a transmitted signal sample; demodulating a combined signal and producing digitally sampled I/Q symbols of the combined signal; modulating the digitally sampled I/Q symbols of the transmitted signal sample and increasing the number of samples per symbol; modulating the digitally sampled I/Q symbols of the combined signal and increasing the number of samples per symbol; correlating the digitally sampled I/Q symbols of the transmitted signal sample with the digitally sampled I/Q symbols of the combined signal and determining an offset or a delay between the relayed version of the transmitted signal included in the combined signal and the transmitted signal; delaying the digitally sampled I/Q symbols of the transmitted signal sample in accordance with the offset or delay determined by a correlator, and producing sampled symbols of a delayed transmitted signal; rotating a phase and adjusting an amplitude of the delayed transmitted signal and producing digitally sampled I/Q symbols of a cancellation signal; digitally subtracting the digitally sampled I/Q symbols of the cancellation signal from the digitally sampled I/Q symbols of the combined signal and canceling the relayed version of the transmitted signal from the combined signal; and providing a subtraction result as an output signal.

2. The method of claim 1, further comprising a step of using the output signal as feedback to the phase rotation and amplitude adjustment step, and minimizing any residual cancellation noise within the output signal.

3. The method of claim 1, wherein the correlating is continued to verify the offset between the relayed version of the transmitted signal included in the combined signal and the transmitted signal within a predefined range around the determined offset value.

4. The method of claim 1, further comprising detecting a change in the offset between the relayed version of the transmitted signal included in the combined signal and the transmitted signal, and adjusting the delay applied to the digitally sampled I/Q symbols of the transmitted signal sample in accordance with the newly determined offset.

5. The method of claim 1, wherein the correlating is unaffected by any phase shift or amplitude difference between the transmitted signal sample and the relayed version of the transmitted signal included in the combined signal.

6. A signal cancellation device comprising: a first demodulator configured to receive a first input of the signal cancellation device; a second demodulator configured to receive a second input of the signal cancellation device; a reference signal source configured to provide a same reference signal to both first and second demodulators; a first modulator configured to receive an output of the first demodulator; a second modulator configured to receive an output of the second demodulator; a correlator configured to receive outputs of both first and second modulators; a phase rotator and amplitude adjustor configured to receive an output of the correlator; and a digital combiner configured to receive an output of the second modulator and an output of the phase rotator and amplitude adjustor;

wherein the signal cancellation device is further configured to: delay digitally sampled I/Q symbols associated with the output of the first modulator in accordance with an offset or delay determined by the correlator, and produce sampled symbols of a delayed signal; rotate phase and adjust amplitude of the delayed signal and produce digitally sampled I/Q symbols of a cancellation signal; digitally subtract the digitally sampled I/Q symbols of the cancellation signal from digitally sampled I/Q symbols associated with the output of the second modulator to cancel a relayed version of the first input of the signal cancellation device from the second input of the signal cancellation device; and provide a subtraction result as an output signal.

7. The signal cancellation device of claim 6, wherein the output of the digital combiner is the output of the signal cancellation device.

8. The signal cancellation device of claim 6, wherein the digital combiner is configured to provide the output to an input of the phase rotator and amplitude adjustor to minimize residual noise at the output of the digital combiner.

9. The signal cancellation device of claim 6, wherein the phase rotator and amplitude adjustor is configured to include a finite response filter.

10. The signal cancellation device of claim 6, wherein:
   a sample of a transmitted signal is provided to the first input of the signal cancellation device; and
   a combined signal comprising signals of interest overlaying a relayed version of the transmitted signal is provided to the second input of the signal cancellation device.

11. The signal cancellation device of claim 6, wherein the first and second demodulators are configured to use a reference signal from the reference signal source to generate at least one of internal clocks or local oscillators.

12. A satellite communication system comprising a hub and plurality of remote terminals, wherein the hub is configured to transmit a forward link signal to the plurality of remote terminals, the plurality of remote terminals are configured to transmit one or more return link signals to the hub, and the one or more return link signals are overlaying the forward link signal, wherein the hub is configured to transmit the forward link signal at a power level sufficiently higher than that of the return link signals to enable the plurality of remote terminals to receive the forward link signal without using any cancellation method; and wherein the hub is further configured to: demodulate a sample of the transmitted forward link signal, and produce digitally sampled I/Q symbols of the transmitted forward link signal sample; demodulate a combination of the forward link signal and the one or more return link signals, and produce digitally sampled I/Q symbols of the combination signal; modulate the digitally sampled I/Q symbols of the transmitted forward link signal sample and increase the number of samples per symbol; modulate the digitally sampled I/Q symbols of the combination signal and increase the number of samples per symbol; correlate the digitally sampled I/Q symbols of the transmitted forward link signal sample with the digitally sampled I/Q symbols of the combination signal, and determine an offset or a delay between a relayed version of the transmitted forward link signal included in the combination signal and the transmitted forward link signal; delay the digitally sampled I/Q symbols of a transmitted signal sample in accordance with the offset or delay determined by a correlator, and produce sampled symbols of a delayed transmitted signal; rotate the phase and adjust the amplitude of the delayed transmitted signal and produce digitally sampled I/Q symbols of a cancellation signal; digitally subtract the digitally sampled I/Q symbols of the cancellation signal from the digitally sampled I/Q symbols of a combined signal and cancel the relayed version of the transmitted signal from the combined signal; and provide the subtraction result as an output signal.

13. The satellite communication system of claim 12, wherein the symbol rate of the forward link signal is configured to be at least one order of magnitude higher than the symbol rate of a fastest return link signal overlaying the forward link's bandwidth.

14. The satellite communication system of claim 12, wherein the steps of demodulating, modulating, and correlating are performed by one or more return link receivers within the hub, and wherein the demodulating the return link signals is performed directly on a cancellation's output and without any additional digital-to-analog-to-digital conversion.

15. The satellite communication system of claim 12, wherein the hub comprises:
   a first demodulator configured to receive a first input;
   a second demodulator configured to receive a second input;
   a reference signal source configured to provide a same reference signal to both first and second demodulators;
   a first modulator configured to receive an output of the first demodulator;
   a second modulator configured to receive an output of the second demodulator;
   a correlator configured to receive outputs of both first and second modulators;
   a phase rotator and amplitude adjustor configured to receive an output of the correlator; and
   a digital combiner configured to receive an output of the second modulator and an output of the phase rotator and amplitude adjustor.

16. The satellite communication system of claim 15, wherein the demodulators, the modulators, the correlator, the phase rotator and amplitude adjustor, and the digital combiner are embedded into one or more return link receivers within the hub.

* * * * *